US012738404B2

(12) United States Patent
Takaku et al.

(10) Patent No.: US 12,738,404 B2
(45) Date of Patent: Sep. 15, 2026

(54) MULTILAYER COIL COMPONENT

(71) Applicant: TDK CORPORATION, Tokyo (JP)

(72) Inventors: Munehiro Takaku, Tokyo (JP); Nobuyuki Okuzawa, Tokyo (JP); Kazuya Tobita, Tokyo (JP); Teruhiro Mitsuyasu, Tokyo (JP)

(73) Assignee: TDK CORPORATION, Tokyo (JP)

( * ) Notice: Subject to any disclaimer, the term of this patent is extended or adjusted under 35 U.S.C. 154(b) by 891 days.

(21) Appl. No.: 18/166,347

(22) Filed: Feb. 8, 2023

(65) Prior Publication Data

US 2023/0307167 A1 Sep. 28, 2023

(30) Foreign Application Priority Data

Mar. 25, 2022 (JP) ................................ 2022-050273

(51) Int. Cl.
*H01F 17/00* (2006.01)
*H01F 27/29* (2006.01)
*H01F 27/28* (2006.01)

(52) U.S. Cl.
CPC ....... *H01F 17/0013* (2013.01); *H01F 27/292* (2013.01); *H01F 2017/0066* (2013.01); *H01F 2027/2809* (2013.01)

(58) Field of Classification Search
CPC ............... H01F 17/0013; H01F 27/292; H01F 2017/0066; H01F 2027/2809
See application file for complete search history.

(56) References Cited

U.S. PATENT DOCUMENTS

| | | | | |
|---|---|---|---|---|
| 2023/0307163 | A1* | 9/2023 | Takaku | H01F 27/292 |
| 2023/0307164 | A1* | 9/2023 | Takaku | H01F 5/04 |
| 2024/0312684 | A1* | 9/2024 | Hashimoto | H01F 5/04 |
| 2026/0066181 | A1* | 3/2026 | Takaku | H01F 27/2828 |

FOREIGN PATENT DOCUMENTS

| | | |
|---|---|---|
| JP | 2015-141945 A | 8/2015 |
| JP | 2020-107760 A | 7/2020 |

* cited by examiner

*Primary Examiner* — Tuyen T Nguyen
(74) *Attorney, Agent, or Firm* — Oliff PLC

(57) ABSTRACT

Provided is a multilayer coil component in which a position of a boundary between a first portion and a third portion in a second wiring portion located closer to a side surface is located closer to an end surface in a first direction than a position of a boundary between a first portion and a third portion in a second wiring portion located closer to a side surface, and a position of a boundary between a second portion and a third portion in a second wiring portion located closer to the side surface is located closer to an end surface in the first direction than a position of a boundary between a second portion and a third portion in a second wiring portion located closer to the side surface.

5 Claims, 4 Drawing Sheets

MULTILAYER COIL COMPONENT

TECHNICAL FIELD

The present disclosure relates to a multilayer coil component.

BACKGROUND

As a conventional multilayer coil component, for example, a multilayer coil component described in Patent Document 1 (Japanese Unexamined Patent Publication No. 2015-141945) is known. The multilayer coil component described in Patent Document 1 includes: an element body that has a pair of end surfaces opposite each other in a first direction, a mounting surface and a main surface opposite each other in a second direction, and a pair of side surfaces opposite each other in a third direction; a coil disposed in the element body; and a pair of terminal electrodes disposed on the mounting surface of the element body, wherein the coil is configured to include a plurality of first wiring portions disposed on the main surface side, a plurality of second wiring portions disposed on the mounting surface side, and a plurality of connecting portions that extend in the second direction and connect the first wiring portions to the second wiring portions.

SUMMARY

In a multilayer coil component, each of the plurality of second wiring portions has a first portion that includes a region overlapping the corresponding connecting portion when viewed in the second direction and is located closer to one end surface, a second portion that includes the region overlapping the corresponding connection portion and is located closer to another end surface, and a third portion that connects the first portion to the second portion and is inclined with respect to the first direction. In this configuration, when the plurality of second wiring portions have the same shape, a pitch between the third portions is smaller than a pitch between the first portions and a pitch between the second portions in the adjacent second wiring portions. Thus, wiring rules (line widths and intervals) of the second wiring portions become stricter. If the wiring rules of the second wiring portions become stricter, a short circuit may occur or a risk of disconnection may increase in the third portions of the second wiring portions. As a result, characteristics of the multilayer coil component may deteriorate or the multilayer coil component may cease to function.

An object of one aspect of the present disclosure is to provide a multilayer coil component of which reliability can be improved.

A multilayer coil component according to one aspect of the present disclosure includes: an element body that includes a pair of end surfaces opposite each other in a first direction, a mounting surface and a main surface opposite each other in a second direction, and a pair of side surfaces opposite each other in a third direction; a pair of terminal electrodes disposed on the mounting surface of the element body; a coil that is disposed in the element body and electrically connected to the pair of terminal electrodes; and a first connecting conductor connecting one end portion of the coil to one terminal electrode and a second connecting conductor connecting the other end portion of the coil to the other terminal electrode, wherein the first connecting conductor is disposed closer to one end surface and closer to the other side surface, the second connecting conductor is disposed closer to the other end surface and closer to one side surface, the coil includes a plurality of first wiring portions disposed on the main surface side, a plurality of second wiring portions disposed on the mounting surface side, and a plurality of connecting portions that extend in the second direction and connect the first wiring portions to the second wiring portions, when viewed in the second direction, each of the plurality of second wiring portions includes a first portion that includes a region overlapping the corresponding connecting portion and is located closer to the one end surface, a second portion that includes a region overlapping the corresponding connecting portion and is located closer to the other end surface, and a third portion that connects the first portion to the second portion and is inclined with respect to the first direction, and in the adjacent second wiring portions, when viewed in the second direction, a position of a boundary between the first portion and the third portion in the second wiring portion located closer to the one side surface is located closer to the other end surface in the first direction than a position of a boundary between the first portion and the third portion in the second wiring portion located closer to the other side surface, and a position of a boundary between the second portion and the third portion in the second wiring portion located closer to the other side surface is located closer to the one end surface in the first direction than a position of a boundary between the second portion and the third portion in the second wiring portion located closer to the one side surface.

In the multilayer coil component according to one aspect of the present disclosure, in the adjacent second wiring portions, when viewed in the second direction, the position of a first boundary between the first portion and the third portion in the second wiring portion located closer to the one side surface is located closer to the other end surface in the first direction than the position of a second boundary between the first portion and the third portion in the second wiring portion located closer to the other side surface, and the position of a third boundary between the second portion and the third portion in the second wiring portion located closer to the other side surface is located closer to the one end surface in the first direction than the position of a fourth boundary between the second portion and the third portion in the second wiring portion located closer to the one side surface. In this way, in the multilayer coil component, the position of the boundary is changed for each second wiring portion. Thus, in the multilayer coil component, a pitch between the first portions, a pitch between the second portions, and a pitch between the third portions can be the same in the adjacent second wiring portions. Accordingly, in the multilayer coil component, since wiring rules can be prevented from becoming stricter, it is possible to inhibit occurrence of a short circuit or an increase in the risk of disconnection in the third portions of the second wiring portions. As a result, reliability of the multilayer coil component can be improved.

In one embodiment, when viewed in the second direction, each of the plurality of second wiring portions may include two bending points at the boundary between the first portion and the third portion and include two bending points at the boundary between the second portion and the third portion, in the second wiring portions, the two bending points of the first portion and the third portion may be located at different positions in the first direction, and the two bending points of the second portion and the third portion may be located at different positions in the first direction, in the adjacent second wiring portions, when viewed in the second direction, the two bending points of the first portion and the third portion in the second wiring portion located closer to the one side surface may be located closer to the other end surface in the first direction than the two bending points of the first portion and the third portion in the second wiring portion located closer to the other side surface, and the two bending points of the second portion and the third portion in the second wiring portion located closer to the other side surface may be located closer to the one end surface in the first direction than the two bending points of the second portion and the third portion in the second wiring portion located closer to the one side surface. In this configuration, the pitch between the first portions, the pitch between the second portions, and the pitch between the third portions can be the same in the adjacent second wiring portions.

In one embodiment, when viewed in the second direction, each of the plurality of second wiring portions may include two bending points at the boundary between the first portion and the third portion and include two bending points at the boundary between the second portion and the third portion, in the second wiring portions, the two bending points of the first portion and the third portion may be located at the same position in the first direction, and the two bending points of the second portion and the third portion may be located at the same position in the first direction, in the adjacent second wiring portions, when viewed in the second direction, the two bending points of the first portion and the third portion in the second wiring portion located closer to the one side surface may be located closer to the other end surface in the first direction than the two bending points of the first portion and the third portion in the second wiring portion located closer to the other side surface, and the two bending points of the second portion and the third portion in the second wiring portion located closer to the other side surface may be located closer to the one end surface in the first direction than the two bending points of the second portion and the third portion in the second wiring portion located closer to the one side surface. In this configuration, the pitch between the first portions, the pitch between the second portions, and the pitch between the third portions can be the same in the adjacent second wiring portions.

In one embodiment, when viewed in the second direction, each of the plurality of second wiring portions may include two bending points at the boundary between the first portion and the third portion and include two bending points at the boundary between the second portion and the third portion, in the second wiring portions, the two bending points of the first portion and the third portion may be located at different positions in the first direction, and the two bending points of the second portion and the third portion may be located at different positions in the first direction, in the adjacent second wiring portions, when viewed in the second direction, a bending point located closer to the other side surface of the two bending points of the first portion and the third portion in the second wiring portion located closer to the one side surface may be located at the same position in the first direction as a bending point located closer to the one side surface of the two bending points of the first portion and the third portion in the second wiring portion located closer to the other side surface, and a bending point located closer to the one side surface of the two bending points of the second portion and the third portion in the second wiring portion located closer to the other side surface may be located at the same position in the first direction as a bending point located closer to the other side surface of the two bending points of the second portion and the third portion in the second wiring portion located closer to the one side surface. In this configuration, the pitch between the first portions, the pitch between the second portions, and the pitch between the third portions can be the same in the adjacent second wiring portions.

In one embodiment, in the adjacent second wiring portions, when viewed in the second direction, a first distance between a side surface located closer to the one side surface of the first portion of the second wiring portion located closer to the one side surface and a side surface located closer to the one side surface of the first portion of the second wiring portion located closer to the other side surface, a second distance between a side surface located closer to the one side surface of the second portion of the second wiring portion located closer to the one side surface and a side surface located closer to the one side surface of the second portion of the second wiring portion located closer to the other side surface, and a third distance between a side surface located closer to the one side surface of the third portion of the second wiring portion located closer to the one side surface and a side surface located closer to the one side surface of the third portion of the second wiring portion located closer to the other side surface may be the same. In this configuration, since the wiring rules can be prevented from becoming stricter, it is possible to inhibit occurrence of a short circuit or an increase in the risk of disconnection in the third portions of the second wiring portions.

According to one aspect of the present invention, reliability can be improved.

DETAILED DESCRIPTION

Figure 1:
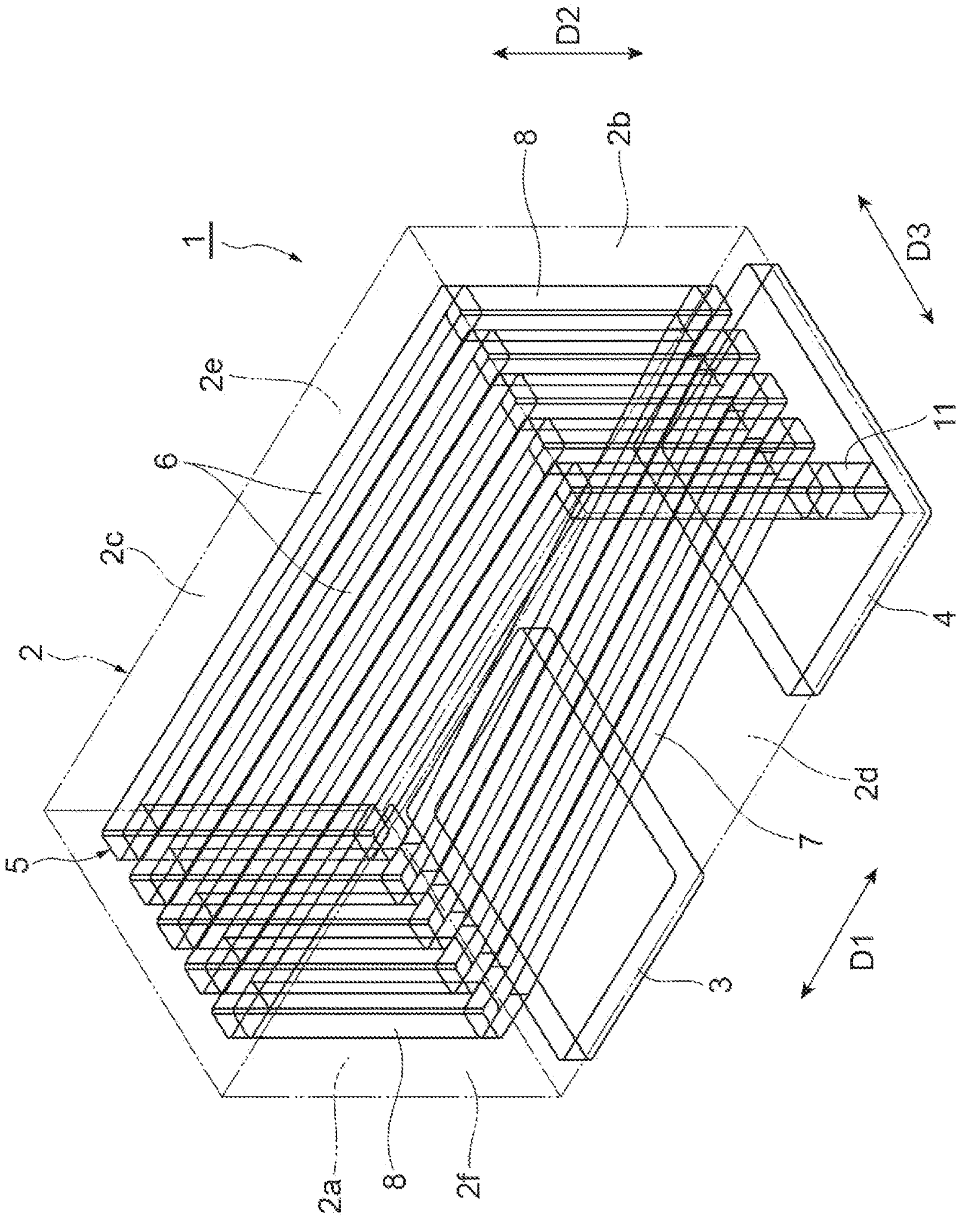
FIG. 1 is a perspective view of a multilayer coil component according to one embodiment.

A preferred embodiment of the present disclosure will be described in detail below with reference to the accompanying drawings. Also, in the description of the drawings, the same or corresponding elements will be denoted by the same reference numerals, and repeated description thereof will be omitted.

Figure 2:
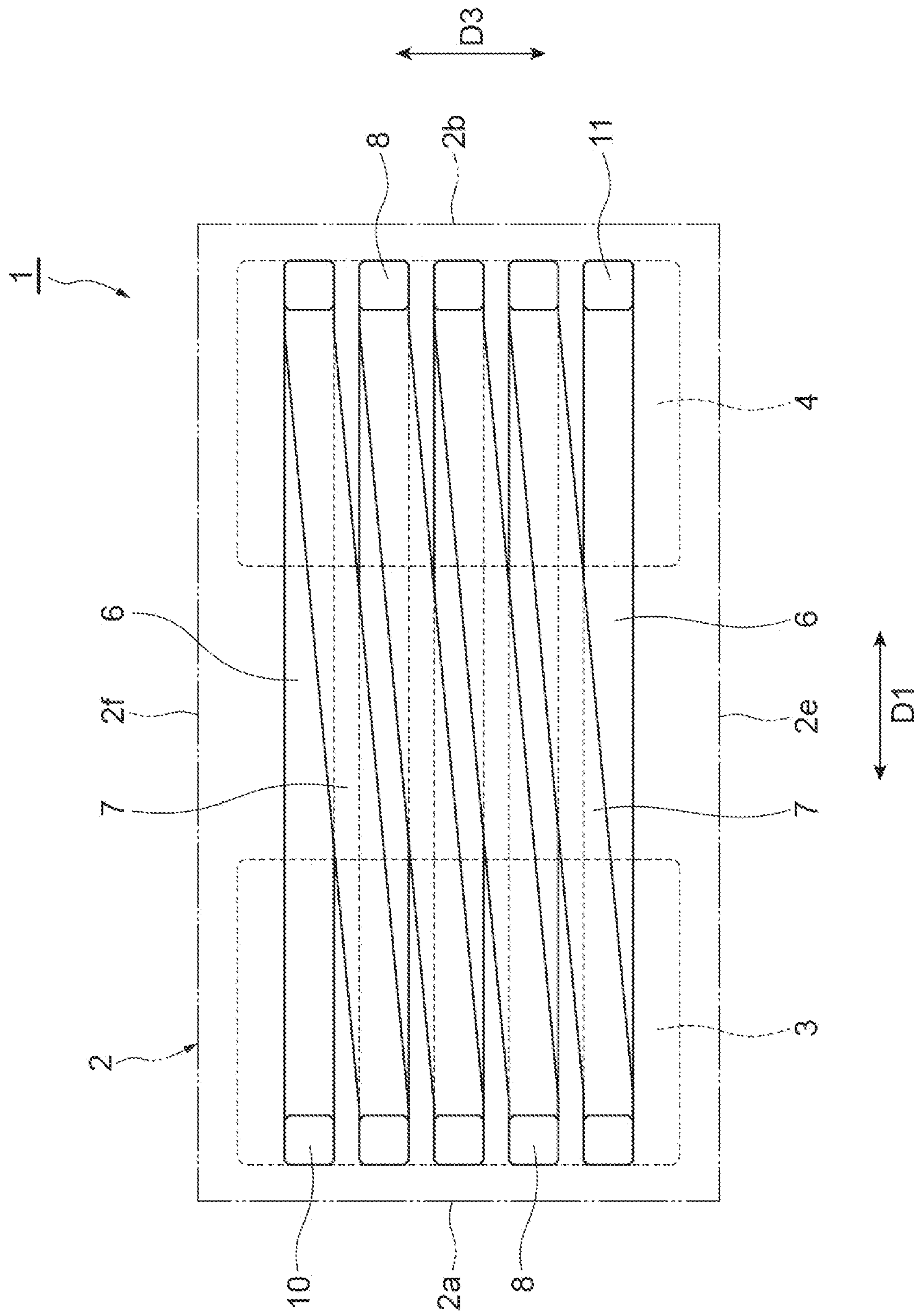
FIG. 2 is a diagram in which the multilayer coil component is viewed from a mounting surface side.

A multilayer coil component according to the present embodiment will be described with reference to FIG. 1. FIG. 1 is a perspective view of a multilayer coil component according to one embodiment. As shown in FIG. 1, the multilayer coil component 1 includes an element body 2, a first terminal electrode 3, a second terminal electrode 4, a coil 5, a first connecting conductor 10 (see FIG. 2), and a second connecting conductor 11. In FIG. 1, for convenience of explanation, the element body 2 is indicated by a two-dot chain line, and the coil 5 is shown transparently. Also in FIG. 2, for convenience of explanation, the coil 5 is shown transparently, and the first terminal electrode 3 and the second terminal electrode 4 are shown by broken lines.

The element body 2 has a rectangular parallelepiped shape. The rectangular parallelepiped shape may be a rectangular parallelepiped shape with chamfered corner portions and edge portions or a rectangular parallelepiped shape with rounded corner portions and edge portions. The element body 2 has, as outer surfaces, a pair of end surfaces **2*a*** and 2*b*, a pair of main surfaces 2*c* and 2*d*, and a pair of side surfaces 2*e* and 2*f*. The end surfaces 2*a* and 2*b* are opposite each other. The main surfaces 2*c* and 2*d* are opposite each other. The side surfaces 2*e* and 2*f* are opposite each other. Hereinafter, a direction in which the end surfaces 2*a* and 2*b* are opposite each other will be defined as a first direction D1, a direction in which the main surfaces 2*c* and 2*d* are opposite each other will be defined as a second direction D2, and a direction in which the side surfaces 2*e* and 2*f* are opposite each other will be defined as a third direction D3. The first direction D1, the second direction D2, and the third direction D3 are substantially orthogonal to each other.

The end surfaces 2*a* and 2*b* extend in the second direction D2 to connect the main surfaces 2*c* and 2*d* to each other. The end surfaces 2*a* and 2*b* also extend in the third direction D3 to connect the side surfaces 2*e* and 2*f* to each other. The main surfaces 2*c* and 2*d* extend in the first direction D1 to connect the end surfaces 2*a* and 2*b* to each other. The main surfaces 2*c* and 2*d* also extend in the third direction D3 to connect the side surfaces 2*e* and 2*f* to each other. The side surfaces 2*e* and 2*f* extend in the first direction D1 to connect the end surfaces 2*a* and 2*b* to each other. The side surfaces 2*e* and 2*f* also extend in the second direction D2 to connect the main surfaces 2*c* and 2*d* to each other.

The main surface 2*d* is a mounting surface and, for example, is a surface that faces another electronic device (not shown) (for example, a circuit board or a multilayer electronic component) when the multilayer coil component 1 is mounted on the other electronic device. The end surfaces 2*a* and 2*b* are surfaces continuous from the mounting surface (that is, the main surface 2*d*).

A length of the element body 2 in the first direction D1 is longer than a length of the element body 2 in the second direction D2 and a length of the element body 2 in the third direction D3. The length of the element body 2 in the second direction D2 is shorter than the length of the element body 2 in the third direction D3. That is, in the present embodiment, the end surfaces 2*a* and 2*b*, the main surfaces 2*c* and 2*d*, and the side surfaces 2*e* and 2*f* have rectangular shapes. The length of the element body 2 in the second direction D2 may be equal to the length of the element body 2 in the third direction D3, or may be longer than the length of the element body 2 in the third direction D3.

Also, in the present embodiment, "equal" may be, in addition to being equal, equal to a value including a slight difference or a manufacturing error within a preset range. For example, when a plurality of values are within ±5% of the mean of the plurality of values, they are defined as being equal.

The element body 2 is formed by laminating a plurality of element body layers (not shown) in the second direction D2. That is, the laminating direction in the element body 2 is the second direction D2. In the actual element body 2, the plurality of element body layers may be integrated to such an extent that boundaries between the layers are invisible, or may be integrated such that the boundaries between the layers are visible.

The element body layer is a resin layer. Materials of the element body layer include at least one selected from, for example, a liquid crystal polymer, a polyimide resin, crystalline polystyrene, an epoxy-based resin, an acryl-based resin, a bismaleimide-based resin, and a fluorine-based resin. The element body layer contains a filler. The filler is, for example, an inorganic filler. As the inorganic filler, for example, silica can be exemplified. Also, the element body layer may not contain the filler.

Also, the element body layer may be configured to contain a magnetic material. The magnetic material of the element body layer includes, for example, a Ni—Cu—Zn-based ferrite material, a Ni—Cu—Zn—Mg-based ferrite material, or a Ni—Cu-based ferrite material. The magnetic material of the element body layer may contain, for example, an Fe alloy. The element body layer may contain, for example, a non-magnetic material. The non-magnetic material of the element body layer includes, for example, a glass-ceramic material or a dielectric material.

Each of the first terminal electrode 3 and the second terminal electrode 4 is provided on the element body 2. Each of the first terminal electrode 3 and the second terminal electrode 4 is disposed on the main surface 2*d* of the element body 2. The first terminal electrode 3 and the second terminal electrode 4 are provided on the element body 2 to be separated from each other in the first direction D1. Specifically, the first terminal electrode 3 is disposed on the end surface 2*a* side of the element body 2. The second terminal electrode 4 is disposed on the end surface 2*b* side of the element body 2.

Each of the first terminal electrode 3 and the second terminal electrode 4 has a rectangular shape (quadrangular shape). Each of the first terminal electrode 3 and the second terminal electrode 4 is disposed such that each side thereof extends in the first direction D1 or the third direction D3. The first terminal electrode 3 and the second terminal electrode 4 also protrude from the main surface 2*d*. That is, in the present embodiment, surfaces of each of the first terminal electrode 3 and the second terminal electrode 4 are not flush with the main surface 2*d*. The first terminal electrode 3 and the second terminal electrode 4 are made of a conductive material (for example, Cu).

Each of the first terminal electrode 3 and the second terminal electrode 4 may be provided with a plating layer (not shown) containing, for example, Ni, Sn, Au, or the like by electrolytic plating or electroless plating. The plating layer may have, for example, a Ni plating film that contains Ni and covers the first terminal electrode 3 and the second terminal electrode 4, and an Au plating film that contains Au and covers the Ni plating film. The plating layer provided on each of the first terminal electrode 3 and the second terminal electrode 4 may protrude from the main surface 2*d*.

The coil 5 is disposed in the element body 2. The coil 5 has a plurality of first wiring portions 6, a plurality of second wiring portions 7, and a plurality of pillar portions (connecting portions) 8. The coil 5 is configured by electrically connecting the first wiring portions 6, the second wiring portions 7, and the pillar portions 8 to each other. A coil axis of the coil 5 is provided in the third direction D3. The plurality of first wiring portions 6, the plurality of second wiring portions 7, and the plurality of pillar portions 8 are made of a conductive material (for example, Cu). The first wiring portions 6, the second wiring portions 7, and the pillar portions 8 are disposed to be separated from the end surfaces 2*a* and 2*b*, the main surfaces 2*c* and 2*d*, and the side surfaces 2*e* and 2*f*.

Each of the first wiring portions 6 is disposed on the main surface 2*c* side of the element body 2. Each of the first wiring portions 6 extends in the first direction D1. Each of the first wiring portions 6 connects two pillar portions 8 to each other. Each of the first wiring portions 6 spans over two pillar portions 8. One end portions of the first wiring portions 6 in an extending direction thereof (end portions on the end surface 2*a* side) are connected to one end portions of the pillar portions 8 (end portions on the main surface 2*c* side). The other end portions of the first wiring portions 6 in the extending direction (end portions on the end surface 2*b* side) are connected to one end portions of the pillar portions 8.

Each of the second wiring portions 7 is disposed on the main surface 2*d* (mounting surface) side of the element body 2. Each of the second wiring portions 7 extends in the first direction D1. Each of the second wiring portions 7 connects two pillar portions 8 to each other. Each of the second wiring portions 7 spans over two pillar portions 8. One end portions of the second wiring portions 7 in an extending direction thereof (end portions on the end surface 2*a* side) are connected to the other end portions of the pillar portions 8 (end portions on the side of the main surface 2*d*). The other end portions of the second wiring portions 7 in the extending direction (end portions on the end surface 2*b* side) are connected to the other end portions of the pillar portions 8. The number of the plurality of second wiring portions 7 is one less than that of the plurality of first wiring portions 6. That is, in a case in which the number of the first wiring portions 6 is n, the number of the second wiring portions 7 is n−1.

The second wiring portions 7 have first portions 7*a*, second portions 7*b*, and third portions 7*c*. The first portions 7*a* include regions overlapping the corresponding pillar portions 8 when viewed in the second direction D2 and are positioned closer to the end surface 2*a*. The first portions 7*a* extend in the first direction D1. The second portions 7*b* include regions overlapping the corresponding pillar portions 8 when viewed in the second direction D2 and are positioned closer to the end surface 2*b*. The second portions 7*b* extend in the first direction D1. The third portions 7*c* connect the first portions 7*a* to the second portions 7*b*. The third portions 7*c* are inclined with respect to the first direction D1 when viewed in the second direction D2.

The pillar portions 8 are disposed on the end surface 2*a* side and the end surface 2*b* side of the element body 2. Each of the pillar portions 8 extends in the second direction D2. The pillar portions 8 connect the first wiring portions 6 to the second wiring portions 7. One end portions of the pillar portions 8 are connected to one end portions and the other end portions of the first wiring portions 6. The other end portions of the pillar portions 8 are connected to one end portions and the other end portions of the second wiring portions 7.

The first connecting conductor 10 connects the first terminal electrode 3 to one end portion of the coil 5. The first connecting conductor 10 is connected to the other end portion of the pillar portion 8 of the coil 5. The first connecting conductor 10 is disposed closer to the end surface (one end surface) 2*a* and closer to the side surface (the other side surface) 2*f*. The first connecting conductor 10 is made of a conductive material (for example, Cu). The second connecting conductor 11 connects the second terminal electrode 4 to the other end portion of the coil 5. The second connecting conductor 11 is connected to the other end portion of the pillar portion 8 of the coil 5. The second connecting conductor 11 is disposed closer to the end surface (the other end surface) 2*b* and closer to the side surface (one side surface) 2*e*. The second connecting conductor 11 is made of a conductive material (for example, Cu).

Figure 3:
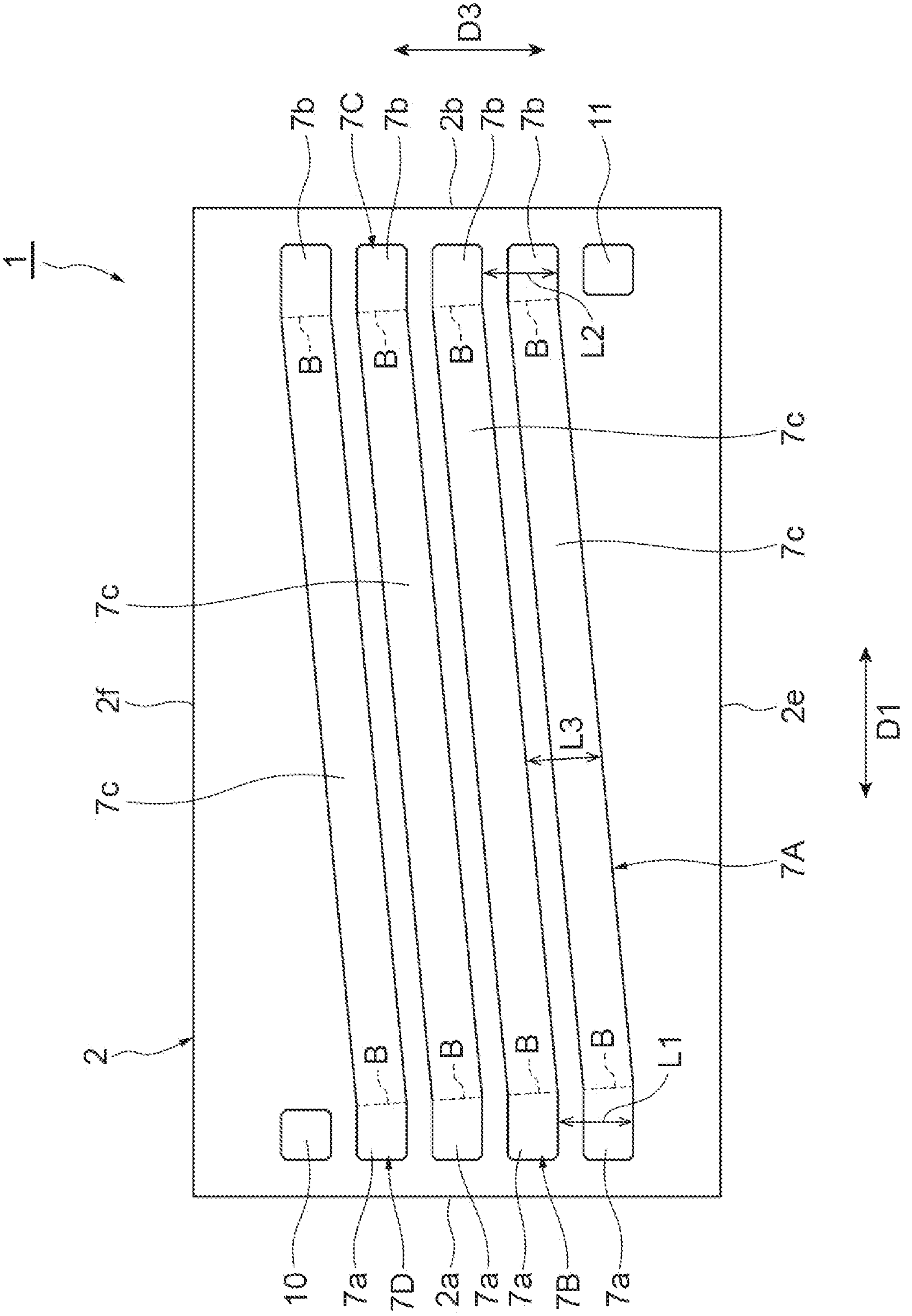
FIG. 3 is a diagram showing a configuration of second wiring portions.

Next, a configuration of the second wiring portions 7 of the coil 5 will be described in detail. FIG. 3 is a diagram showing a configuration of the second wiring portions 7. FIG. 3 shows a state in which the second wiring portions 7 are viewed from the main surface 2*c* side. In the multilayer coil component 1, as shown in FIG. 3, in the adjacent second wiring portions 7, when viewed in the second direction D2, a position of a boundary B between the first portion 7*a* and the third portion 7*c* in the second wiring portion 7 located closer to the side surface 2*e* is located closer to the end surface 2*b* in the first direction D1 than a position of a boundary B between the first portion 7*a* and the third portion 7*c* in the second wiring portion 7 located closer to the side surface 2*f*. Also, in the adjacent second wiring portions 7, when viewed from the second direction D2, a position of a boundary B between the second portion 7*b* and the third portion 7*c* in the second wiring portion 7 located closer to the side surface 2*f* is located closer to the end surface 2*a* in the first direction D1 than a position of a boundary B between the second portion 7*b* and the third portion 7*c* in the second wiring portion 7 located closer to the side surface 2*e*. In FIG. 3, the boundaries B are indicated by broken lines.

The second wiring portions 7 will be described more specifically. In the following description, for convenience of explanation, the plurality (four) of the second wiring portions 7 will be referred to as a second wiring portion 7A, a second wiring portion 7B, a second wiring portion 7C, and a second wiring portion 7D.

As shown in FIG. 3, for example, in the adjacent second wiring portions 7A and 7B, when viewed in the second direction D2, a position of the boundary B between the first portion 7*a* and the third portion 7*c* in the second wiring portion 7A located closer to the side surface 2*e* is located closer to the end surface 2*b* in the first direction D1 than a position of the boundary B between the first portion 7*a* and the third portion 7*c* in the second wiring portion 7B located closer to the side surface 2*f*. Also, in the adjacent second wiring portions 7A and 7B, when viewed in the second direction D2, a position of the boundary B between the second portion 7*b* and the third portion 7*c* in the second wiring portion 7B located closer to the side surface 2*f* is located closer to the end surface 2*a* in the first direction D1 than a position of the boundary B between the second portion 7*b* and the third portion 7*c* in the second wiring portion 7A located closer to the side surface 2*e*.

Similarly, for example, in the adjacent second wiring portions 7B and 7C, when viewed in the second direction D2, a position of the boundary B between the first portion 7*a* and the third portion 7*c* in the second wiring portion 7B located closer to the side surface 2*e* is located closer to the end surface 2*b* in the first direction D1 than a position of the boundary B between the first portion 7*a* and the third portion 7*c* in the second wiring portion 7C located closer to the side surface 2*f*. Also, in the adjacent second wiring portions 7B and 7C, when viewed from the second direction D2, a position of the boundary B between the second portion 7*b* and the third portion 7*c* in the second wiring portion 7C located closer to the side surface 2*f* is located closer to the end surface 2*a* in the first direction D1 than a position of the boundary B between the second portion 7*b* and the third portion 7*c* in the second wiring portion 7B located closer to the side surface 2*e*.

Similarly, for example, in the adjacent second wiring portions 7C and 7D, when viewed in the second direction D2, a position of the boundary B between the first portion 7*a* and the third portion 7*c* in the second wiring portion 7C located closer to the side surface 2*e* is located closer to the end surface 2*b* in the first direction D1 than a position of the boundary B between the first portion 7*a* and the third portion 7*c* in the second wiring portion 7D located closer to the side surface 2*f*. Also, in the adjacent second wiring portions 7C and 7D, when viewed in the second direction D2, a position of the boundary B between the second portion 7*b* and the third portion 7*c* in the second wiring portion 7D located closer to the side surface 2*f* is located closer to the end surface 2*a* in the first direction D1 than a position of the boundary B between the second portion 7*b* and the third portion 7*c* in the second wiring portion 7C located closer to the side surface 2*e*.

Figure 4:
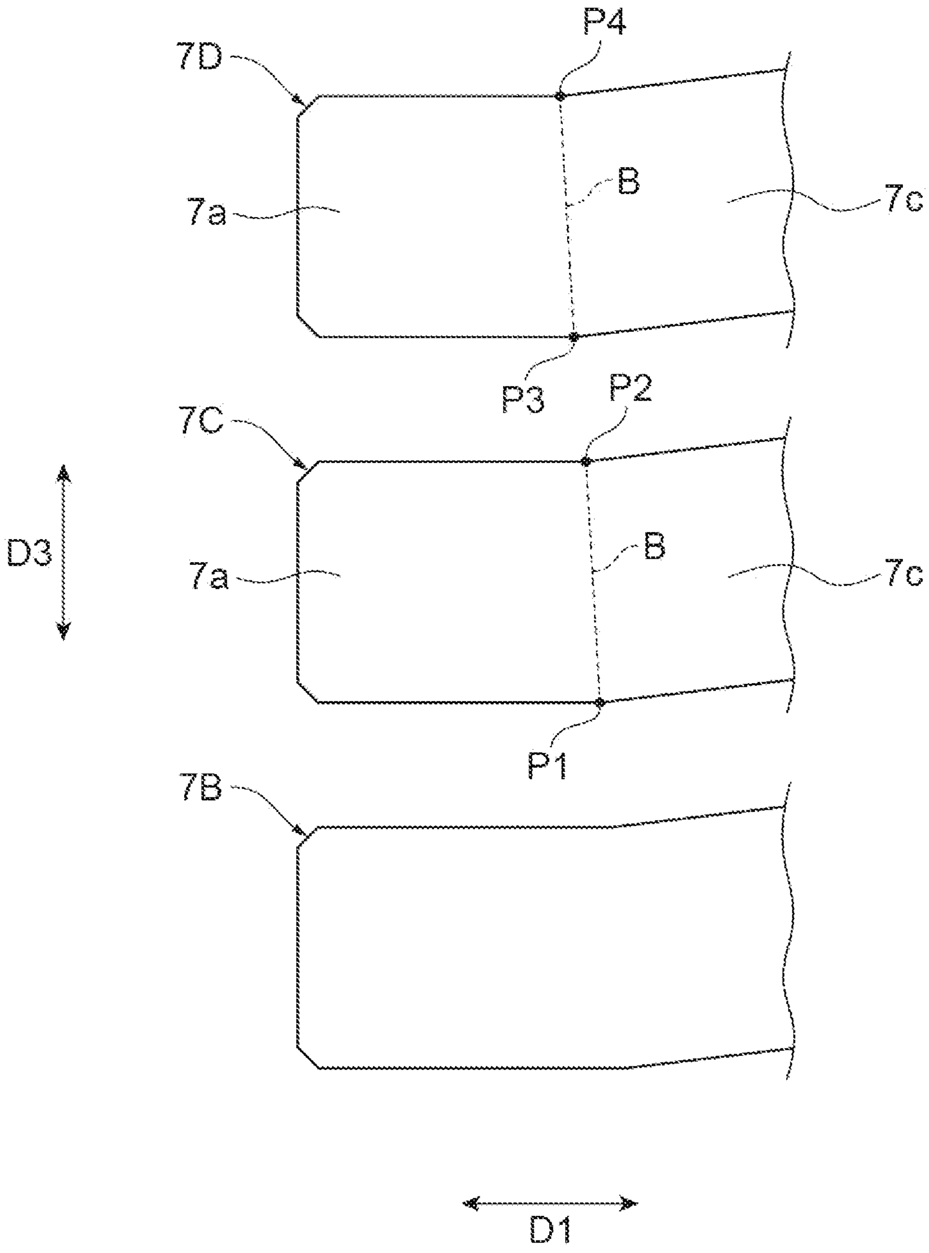
FIG. 4 is a diagram showing a part of the second wiring portions shown in FIG. 3 enlarged.

FIG. 4 is a diagram showing a part of the second wiring portions 7 shown in FIG. 3 enlarged. In the example shown in FIG. 4, the second wiring portion 7C and the second wiring portion 7D will be described as examples. As shown in FIG. 4, the second wiring portion 7C has a bending point P1 and a bending point P2 at the boundary B between the first portion 7*a* and the third portion 7*c*. The bending point P1 is a linking portion (connecting portion) between a side surface of the first portion 7*a* and a side surface of the third portion 7*c* located closer to the side surface 2*e* in the second wiring portion 7C. The bending point P2 is a linking portion between a side surface of the first portion 7*a* and a side surface of the third portion 7*c* located closer to the side surface 2*f* in the second wiring portion 7C. A straight line connecting the bending point P1 to the bending point P2 corresponds to the boundary B between the first portion 7*a* and the third portion 7*c* in the second wiring portion 7C.

When viewed in the second direction D2, the bending point P1 is located closer to the end surface 2*b* in the first direction D1 than the bending point P2. In other words, the bending point P2 is located closer to the end surface 2*a* in the first direction D1 than the bending point P1. A distance between an end surface located closer to the end surface 2*a* of the first portion 7*a* and the bending point P1 is longer than a distance between the end surface and the bending point P2.

The second wiring portion 7D has a bending point P3 and a bending point P4 at the boundary B between the first portion 7*a* and the third portion 7*c*. The bending point P3 is a linking portion between a side surface of the first portion 7*a* and a side surface of the third portion 7*c* located closer to side surface 2*e* in the second wiring portion 7D. The bending point P4 is a linking portion between a side surface of the first portion 7*a* and a side surface of the third portion 7*c* located closer to the side surface 2*f* in the second wiring portion 7D. A straight line connecting the bending point P3 to the bending point P4 corresponds to the boundary B between the first portion 7*a* and the third portion 7*c* in the second wiring portion 7D.

When viewed in the second direction D2, the bending point P3 is located closer to the end surface 2*b* in the first direction D1 than the bending point P4. In other words, the bending point P4 is located closer to the end surface 2*a* in the first direction D1 than the bending point P3. A distance between an end surface located closer to the end surface 2*a* of the first portion 7*a* and the bending point P3 is longer than a distance between the end surface and the bending point P4.

In the adjacent second wiring portion 7C and second wiring portion 7D, the bending point P1 and the bending point P2 are located closer to the end surface 2*b* in the first direction D1 than the bending point P3 and the bending point P4. In other words, the bending point P3 and the bending point P4 are located closer to the end surface 2*a* in the first direction D1 than the bending point P1 and the bending point P2.

The bending point P1, the bending point P2, the bending point P3, and the bending point P4 can be connected to each other by a straight line. The straight line is inclined with respect to the third direction D3 when viewed in the second direction D2. Each of the second wiring portions 7A to 7D has bending points at the linking portion between the first portion 7*a* and the third portion 7*c*. All bending points can be connected to each other by the straight line.

Each of the second wiring portions 7A to 7D also has bending points at the linking portion between the second portion 7*b* and the third portion 7*c*. All bending points can be connected to each other by a straight line. The straight line connecting the bending points of the first portion 7*a* and the third portion 7*c* in each of the second wiring portions 7A to 7D and the straight line connecting the bending points of the second portion 7*b* and the third portion 7*c* in each of the second wiring portions 7A to 7D are parallel to each other.

As shown in FIG. 3, in the multilayer coil component 1, for example, in the adjacent second wiring portions 7A and 7B, when viewed in the second direction D2, a first pitch (first distance) L1 between a side surface of the first portion 7*a* of the second wiring portion 7A located closer to the side surface 2*e* and a side surface of the first portion 7*a* of the second wiring portion 7B located closer to the side surface 2*e*, a second pitch (second distance) L2 between a side surface of the second portion 7*b* of the second wiring portion 7A located closer to the side surface 2*e* and a side surface of the second portion 7*b* of the second wiring portion 7B located closer to the side surface 2*e*, and a third pitch (third distance) L3 between a side surface of the third portion 7*c* of the second wiring portion 7A located closer to the side surface 2*e* and a side surface of the third portion 7*c* of the second wiring portion 7B located closer to the side surface 2*e* are the same (L1=L2=L3). The first pitch L1, the second pitch L2, and the third pitch L3 are the shortest distances.

The multilayer coil component 1 can be manufactured, for example, as follows. The element body 2 can be formed by laminating sheets constituting the element body layers. The coil 5 (the first wiring portions 6, the second wiring portions 7, the pillar portions 8), the first connecting conductor 10, and the second connecting conductor 11 can be manufactured using a photolithography method. The "photolithography method" is not limited by a type of mask and the like as long as it processes a desired pattern by exposing and developing a processing target layer containing a photosensitive material.

As described above, in the multilayer coil component 1 according to the present embodiment, in the adjacent second wiring portions 7, when viewed in the second direction D2, the position of the boundary B between the first portion 7*a* and the third portion 7*c* in the second wiring portion 7 located closer to the side surface 2*e* is located closer to the end surface 2*b* in the first direction D1 than the position of the boundary B between the first portion 7*a* and the third portion 7*c* in the second wiring portion 7 located near the side surface 2*f*. Also, in the multilayer coil component 1, in the adjacent second wiring portions 7, when viewed in the second direction D2, the position of the boundary B between the second portion 7*b* and the third portion 7*c* in the second wiring portion 7 located closer to the side surface 2*f* is located closer to the end surface 2*a* in the first direction D1 than the position of the boundary B between the second portion 7*b* and the third portion 7*c* in the second wiring portion 7 located closer to the side surface 2*e*.

In this way, in the multilayer coil component 1, the position of the boundary B is changed for each second wiring portion 7. Thus, in the multilayer coil component 1, the first pitch L1 between the first portions 7*a*, the second pitch L2 between the second portions 7*b*, and the third pitch L3 between the third portions 7*c* can be the same (L1=L2=L3) in the adjacent second wiring portions 7. Accordingly, in the multilayer coil component 1, since wiring rules can be prevented from becoming stricter, it is possible to inhibit occurrence of a short circuit or an increase in the risk of disconnection in the third portions 7*c* of the second wiring portions 7. As a result, reliability of the multilayer coil component 1 can be improved.

In the multilayer coil component 1 according to the present embodiment, when viewed in the second direction D2, each of the plurality of second wiring portions 7 has two bending points at the boundary between the first portion 7*a* and the third portion 7*c* and has two bending points at the boundary between the second portion 7*b* and the third portion 7*c*. In the multilayer coil component 1, in the second wiring portion 7 located closer to the side surface 2*e*, the two bending points of the first portion 7*a* and the third portion 7*c* are located at different positions in the first direction D1, and the two bending points of the second portion 7*b* and the third portion 7*c* are located at different positions in the first direction D1. In the multilayer coil component 1, in the second wiring portion 7 located closer to the side surface 2*f*, the two bending points of the first portion 7*a* and the third portion 7*c* are located at different positions in the first direction D1, and the two bending points of the second portion 7*b* and the third portion 7*c* are located at different positions in the first direction D1. In the multilayer coil component 1, in the adjacent second wiring portions 7, when viewed in the second direction D2, the two bending points of the first portion 7*a* and the third portion 7*c* of the second wiring portion 7 located closer to the side surface 2*e* are located closer to the end surface 2*b* in the first direction D1 than the two bending points of the first portion 7*a* and the third portion 7*c* of the second wiring portion 7 located closer to the side surface 2*f*, and the two bending points of the second portion 7*b* and the third portion 7*c* of the second wiring portion 7 located closer to the side surface 2*e* are located closer to the end surface 2*b* in the first direction D1 than the two bending points of the second portion 7*b* and the third portion 7*c* of the second wiring portion 7 located closer to the side surface 2*f*. In this configuration, in the adjacent second wiring portions 7, the first pitch L1 between the first portions 7*a*, the second pitch L2 between the second portions 7*b*, and the third pitch L3 between the third portions 7*c* can be the same (L1=L2=L3).

Although the embodiment of the present invention has been described above, the present invention is not necessarily limited to the above-described embodiment, and various modifications can be made without departing from the gist thereof.

In the above-described embodiment, as shown in FIG. 4, an aspect in which, when viewed in the second direction D2, the bending point P1 is located closer to the end surface 2*b* in the first direction D1 than the bending point P2, the bending point P3 is located closer to the end surface 2*b* in the first direction D1 than the bending point P4, and in the adjacent second wiring portion 7C and second wiring portion 7D, the bending point P1 and the bending point P2 are located closer to the end surface 2*b* in the first direction D1 than the bending point P3 and the bending point P4 has been described as one example.

However, the bending point P1 and the bending point P2 may be located at the same position in the first direction D1 (the straight line connecting the bending point P1 to the bending point P2 is substantially parallel to the third direction D3), the bending point P3 and the bending point P4 may be located at the same position in the first direction D1 (the straight line connecting the bending point P3 to the bending point P4 is substantially parallel to the third direction D3), and in the adjacent second wiring portion 7C and second wiring portion 7D, the bending point P1 and the bending point P2 may be located closer to the end surface 2*b* in the first direction D1 than the bending point P3 and the bending point P4. Also in this configuration, in the adjacent second wiring portions 7, the first pitch L1 between the first portions 7*a*, the second pitch L2 between the second portions 7*b*, and the third pitch L3 between the third portions 7*c* can be the same (L1=L2=L3).

Further, the bending point P1 may be located closer to the end surface 2*b* in the first direction D1 than the bending point P2, the bending point P3 may be located closer to the end surface 2*b* in the first direction D1 than the bending point P4, and in the adjacent second wiring portion 7C and the second wiring portion 7D, the bending point P2 and the bending point P3 may be located at the same position in the first direction D1. Also in this configuration, in the adjacent second wiring portions 7, the first pitch L1 between the first portions 7*a*, the second pitch L2 between the second portions 7*b*, and the third pitch L3 between the third portions 7*c* can be the same (L1=L2=L3).

In the above embodiment, an aspect in which the first terminal electrode 3 and the second terminal electrode 4 protrude from the main surface 2*d* has been described as one example. However, the first terminal electrode 3 and the second terminal electrode 4 may be embedded within the element body 2. That is, the first terminal electrode 3 and the second terminal electrode 4 may be provided to be substantially flush with the main surface 2*d*. In this configuration, the plating layers provided on each of the first terminal electrode 3 and the second terminal electrode 4 may protrude from the main surface 2*d*.

What is claimed is:

1. A multilayer coil component comprising:

an element body that includes a pair of end surfaces opposite each other in a first direction, a mounting surface and a main surface opposite each other in a second direction, and a pair of side surfaces opposite each other in a third direction;

a pair of terminal electrodes disposed on the mounting surface of the element body;

a coil that is disposed in the element body and electrically connected to the pair of terminal electrodes; and a first connecting conductor connecting one end portion of the coil to one terminal electrode and a second connecting conductor connecting the other end portion of the coil to the other terminal electrode, wherein the first connecting conductor is disposed closer to one end surface and closer to the other side surface, the second connecting conductor is disposed closer to the other end surface and closer to one side surface, the coil includes a plurality of first wiring portions disposed on the main surface side, a plurality of second wiring portions disposed on the mounting surface side, and a plurality of connecting portions that extend in the second direction and connect the first wiring portions to the second wiring portions, when viewed in the second direction, each of the plurality of second wiring portions includes:

a first portion that includes a region overlapping the corresponding connecting portion and is located closer to the one end surface;

a second portion that includes a region overlapping the corresponding connecting portion and is located closer to the other end surface; and a third portion that connects the first portion to the second portion and is inclined with respect to the first direction, in the adjacent second wiring portions, when viewed in the second direction, a position of a boundary between the first portion and the third portion in the second wiring portion located closer to the one side surface is located closer to the other end surface in the first direction than a position of a boundary between the first portion and the third portion in the second wiring portion located closer to the other side surface, and a position of a boundary between the second portion and the third portion in the second wiring portion located closer to the other side surface is located closer to the one end surface in the first direction than a position of a boundary between the second portion and the third portion in the second wiring portion located closer to the one side surface.

2. The multilayer coil component according to claim 1, wherein, when viewed in the second direction, each of the plurality of second wiring portions includes two bending points at the boundary between the first portion and the third portion and includes two bending points at the boundary between the second portion and the third portion, in the second wiring portions, the two bending points of the first portion and the third portion are located at different positions in the first direction, and the two bending points of the second portion and the third portion are located at different positions in the first direction, in the adjacent second wiring portions, when viewed in the second direction, the two bending points of the first portion and the third portion in the second wiring portion located closer to the one side surface are located closer to the other end surface in the first direction than the two bending points of the first portion and the third portion in the second wiring portion located closer to the other side surface, and the two bending points of the second portion and the third portion in the second wiring portion located closer to the other side surface are located closer to the one end surface in the first direction than the two bending points of the second portion and the third portion in the second wiring portion located closer to the one side surface.

3. The multilayer coil component according to claim 1, wherein, when viewed in the second direction, each of the plurality of second wiring portions includes two bending points at the boundary between the first portion and the third portion and includes two bending points at the boundary between the second portion and the third portion, in the second wiring portions, the two bending points of the first portion and the third portion are located at the same position in the first direction, and the two bending points of the second portion and the third portion are located at the same position in the first direction, in the adjacent second wiring portions, when viewed in the second direction, the two bending points of the first portion and the third portion in the second wiring portion located closer to the one side surface are located closer to the other end surface in the first direction than the two bending points of the first portion and the third portion in the second wiring portion located closer to the other side surface, and the two bending points of the second portion and the third portion in the second wiring portion located closer to the other side surface are located closer to the one end surface in the first direction than the two bending points of the second portion and the third portion in the second wiring portion located closer to the one side surface.

4. The multilayer coil component according to claim 1, wherein, when viewed in the second direction, each of the plurality of second wiring portions includes two bending points at the boundary between the first portion and the third portion and includes two bending points at the boundary between the second portion and the third portion, in the second wiring portions, the two bending points of the first portion and the third portion are located at different positions in the first direction, and the two bending points of the second portion and the third portion are located at different positions in the first direction, in the adjacent second wiring portions, when viewed in the second direction, a bending point located closer to the other side surface of the two bending points of the first portion and the third portion in the second wiring portion located closer to the one side surface is located at the same position in the first direction as a bending point located closer to the one side surface of the two bending points of the first portion and the third portion in the second wiring portion located closer to the other side surface, and a bending point located closer to the one side surface of the two bending points of the second portion and the third portion in the second wiring portion located closer to the other side surface is located at the same position in the first direction as a bending point located closer to the other side surface of the two bending points of the second portion and the third portion in the second wiring portion located closer to the one side surface.

5. The multilayer coil component according to claim 1, wherein, in the adjacent second wiring portions, when viewed in the second direction, a first distance, a second distance, and a third distance are the same, the first distance being between a side surface located closer to the one side surface of the first portion of the second wiring portion located closer to the one side surface and a side surface located closer to the one side surface of the first portion of the second wiring portion located closer to the other side surface, the second distance being between a side surface located closer to the one side surface of the second portion of the second wiring portion located closer to the one side surface and a side surface located closer to the one side surface of the second portion of the second wiring portion located closer to the other side surface, and the third distance being between a side surface located closer to the one side surface of the third portion of the second wiring portion located closer to the one side surface and a side surface located closer to the one side surface of the third portion of the second wiring portion located closer to the other side surface.

* * * * *